United States Patent
Metzler

(10) Patent No.: US 11,348,321 B2
(45) Date of Patent: May 31, 2022

(54) AUGMENTED VIEWING OF A SCENERY AND SUBSURFACE INFRASTRUCTURE

(71) Applicant: HEXAGON TECHNOLOGY CENTER GMBH, Heerbrugg (CH)

(72) Inventor: Bernhard Metzler, Dornbirn (AT)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 0 days.

(21) Appl. No.: 17/176,766

(22) Filed: Feb. 16, 2021

(65) Prior Publication Data

US 2021/0256770 A1   Aug. 19, 2021

(30) Foreign Application Priority Data

Feb. 17, 2020   (EP) ..................................... 20157636

(51) Int. Cl.
*G06T 19/00*   (2011.01)
*H04N 5/232*   (2006.01)
*G02B 27/02*   (2006.01)

(52) U.S. Cl.
CPC .......... *G06T 19/006* (2013.01); *G02B 27/022* (2013.01); *H04N 5/23299* (2018.08)

(58) Field of Classification Search
CPC ............... G06T 19/006; G02B 27/022; H04N 5/23299; G06F 3/012; G06F 3/011
See application file for complete search history.

(56) References Cited

U.S. PATENT DOCUMENTS

| 2012/0127161 | A1  | 5/2012 | Wallbom |
|2013/0084838 | A1* | 4/2013 | Smith ................... H04W 4/026 455/414.2 |
| 2014/0125668 | A1 | 5/2014 | Steed |
| 2014/0210856 | A1 | 7/2014 | Finn |
| 2017/0046877 | A1 | 2/2017 | Hustad |

FOREIGN PATENT DOCUMENTS

| WO | 2018/160921 | | 9/2018 |
| WO | 2020/030948 | A1 | 2/2020 |

OTHER PUBLICATIONS

European Search Report dated Sep. 22, 2020 as received in application No. 20157636.0.

* cited by examiner

*Primary Examiner* — Jeffery A Brier
(74) *Attorney, Agent, or Firm* — Maschoff Brennan

(57) ABSTRACT

A method of providing an augmented view of a real world scenery and of an occluded subsurface infrastructure. An image is taken by a camera with an image sensor and image reference information comprising a camera position and a camera orientation. From three dimensional information of a subsurface infrastructure, a two dimensional projection on the image sensor is made by using the reference information. A projection position of an anchor element of the subsurface infrastructure being visible on the at least one image is compared with an image position of the anchor element. A difference between the image position and the projection position is compensated for matching and overlaying the two dimensional projection derived from the three dimensional information of the subsurface infrastructure with the at least one image and thereby providing an improved augmented view.

14 Claims, 5 Drawing Sheets

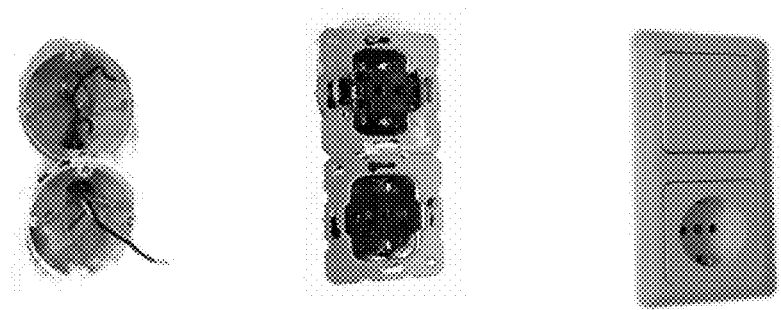

Different visual appearances of a light switch / power socket combination depending on the construction progress

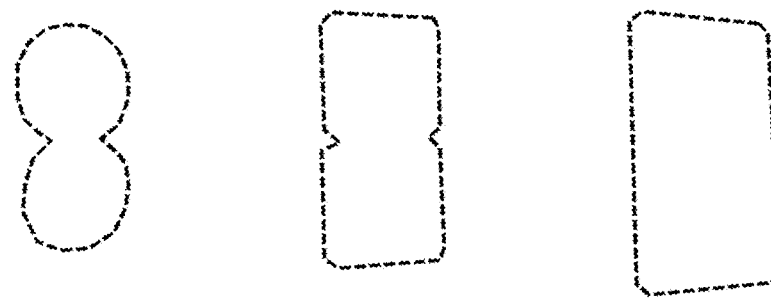

Corresponding object segmentations

Fig. 6

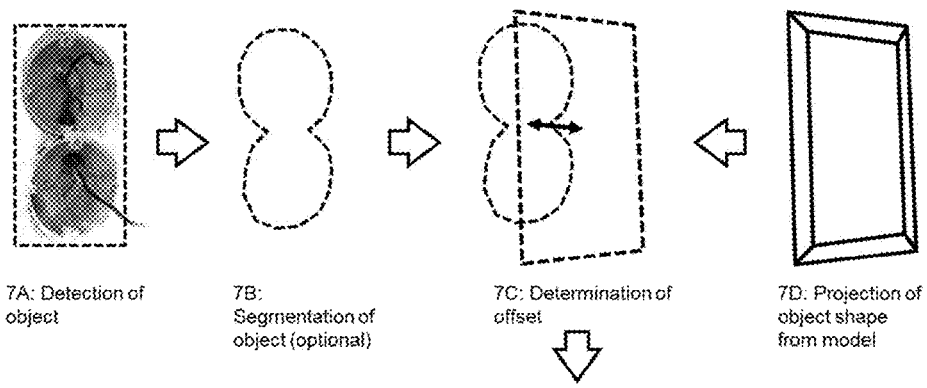

7A: Detection of object

7B: Segmentation of object (optional)

7C: Determination of offset

7D: Projection of object shape from model

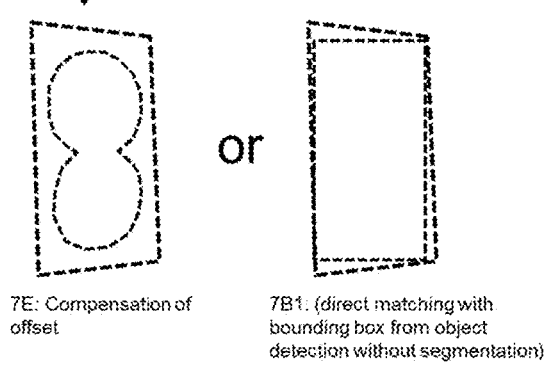

7E: Compensation of offset

7B1: (direct matching with bounding box from object detection without segmentation)

Fig. 7

AUGMENTED VIEWING OF A SCENERY AND SUBSURFACE INFRASTRUCTURE

CROSS-REFERENCE TO RELATED APPLICATIONS

This application claims priority to European Patent Application No. 20157636.0, filed on Feb. 17, 2020. The foregoing patent application is herein incorporated by reference.

FIELD OF INVENTION

The present invention relates generally to a method for deriving an augmented view of subsurface infrastructure, as well as to a mobile augmented reality viewing device and a computer program product. More particularly, the present invention relates to a determination of structures which are at least partially hidden beneath a solid surface. In particular, the invention is related to a visualization of structures beneath an opaque surface in an augmented reality (AR) view. Such subsurface structures can for example be pipework, cables, ducts, channels, tunnels, vents, connectors, bunkers or other subsurface construction work.

FIELD OF INVENTION

When working through an opaque surface, there is often the question what part of a hidden structure could or should be hit. Not only in case of inspection or repair of subsurface utilities, like ruptured, corroded, worn or leaking pipes or wirings, but also when planning and adding new or additional utilities. Also, when general construction work is done, an occupation and/or clearance of a worksite with respect to subsurface facilities has to be checked and verified in advance of operations to be performed. For example, it has to be derived in which areas caution is needed. Another question is whether subsurface facilities are live or not, if there are orphaned structures that can be destroyed without any harm, which of the subsurface structures have to be shut down before work and where and how to shut them down, etc. Such need not only arises for off-site planning but also live at-site, before and/or during work.

Although plan or map data is available and/or such data can be derived by detection equipment like cable-detectors, cable-locators, cable-tracers, cable avoidance tools (CAT), penetrating radar, metal detectors, sonars, etc.—such available data tends to be difficult to read at site and often requires a usage of surveying equipment to spatially reference the plan to the real world.

Recently, so-called augmented reality (AR) technology is used for doing so. Therein, an actual view of the real world—e.g. captured by a 2D or 3D camera or by a see-though device—is visually overlaid by computer generated graphics and renderings to augment the real world view with additional virtual information. Computational frameworks and software development kits (SDK) like the "ARKit", "ARCore", "Wikitude", "Vuforia", "ARToolKit" etc. are providing a wide range of basic functionalities, enabling the implementation of AR-views which can be used in the present invention, e.g. on a mobile device like a smartphone, tablet computer, virtual reality glasses, head-mounted displays (HMD), head-up displays (HUD), Eye-Taps or the like.

The mobile device comprises one or more motion tracking technologies for deriving a location and orientation in space, like global navigation satellite systems (GNSS) e.g. GPS, accelerometers, gyroscopes or solid state compasses.

For example, a still image, a live video or an image stream is captured by a camera, spatially referenced in its environment and overlaid by a virtually rendered object on top of the video or image(s). For example, WO 2018/160921 mentions generating a superimposed image of an implement of a material moving machine, a virtual trench and underground features. In the field of excavators, the requirement for overlaying accuracy is much lower than in other fields. Therefore, the disclosed solution is limited to the field of excavators.

US 2014/210856 A1 is disclosing overlaying an image of a wall or a ceiling with an image of a 3D digital model of internal elements e.g. pipes or conduits. Markers have to be placed at predetermined coordinates on an external element of the wall or ceiling. The markers on the image allow a precise overlaying of the image and the 3D digital model. The need for placing markers on the wall or ceiling is not acceptable in many applications and it is very time consuming.

BRIEF DESCRIPTION

It is therefore an object some aspects of the invention to find a solution for precise overlaying images and 3D digital models without the need for applying markers.

The object is achieved by realizing the features of the independent claims. Features, which further develop the invention in an alternative or advantageous manner are described in the dependent patent claims.

Inventive providing of an augmented view of a real world scenery and an occluded subsurface infrastructure is comprising:
  taking at least one image of the real world scenery by a camera with an image sensor,
  providing image reference information to the at least one image, wherein the image reference information is comprising a camera position and a camera orientation in the real world scenery at the time of taking the at least one image and optionally also internal parameters of the camera characterizing the optical center and the focal length (as an alternative without such internal parameters, an iterative approach is chosen wherein for example the image is shifted by some pixels till it fits),
  providing three dimensional information of a subsurface infrastructure,
  deriving from the three dimensional information of the subsurface infrastructure a two dimensional projection at the image sensor, wherein the two dimensional projection is made by using the reference information of the at least one image, and
  comparing a projection position of a two dimensional projection of at least one anchor element of the subsurface infrastructure being visible on the at least one image of the real world scenery with an image position of the same anchor element on the at least one image, and
  using a difference between the image position and the projection position of the same anchor element from the comparing for matching and overlaying the two dimensional projection derived from the three dimensional information of the subsurface infrastructure with the at least one image and thereby providing the augmented view.

The inventive solution can be implemented in the form of a method, a mobile device or a computer program product.

Augmented viewing of overlaid images of real world scenery and occluded subsurface infrastructure is applied in areas with good and with poor localization of the camera taking the images. For example, in areas of limited reception of the GNSS signals or in indoor environments the determined position with respect to the geo-referenced 3d-model of the subsurface infrastructure might be inaccurate. This leads to deviations between the overlaid information and the live-view image captured with the camera.

The camera position and/or the camera orientation in the real world scenery can be deduced from data of a navigation system like a navigation satellite system (GPS) and/or of a base station navigation and/or of an accelerometer and/or of a gyroscope and/or of an inertial measurement unit (IMU) and/or of a solid state compass and/or of a structure-from-motion unit and/or of a bundle adjustment unit and/or of a Simultaneous Localization and Mapping (SLAM) unit and/or of a spatial reference recognition unit using existing reference points with defined spatial positions.

According to some aspects of the invention, misalignment due to inaccurate camera position and orientation information can be reduced or prevented by deriving position and/or orientation information of visible elements of the geo-referenced 3d-model of the subsurface infrastructure. Subsurface infrastructure, e.g. sewerage or electrical installations, have connecting elements, e g manholes in case of a sewerage or power sockets and light switches in case of an electrical installation, which are visible in images of the real world scenery. Such visible elements can be found on at least one image taken by the camera and in the geo-referenced 3d-model. These visible elements are called anchor elements. The anchor elements can therein also be selected from other visible structures that are comprised in the image and available in a geo-referenced 3d-model of infrastructure, not necessarily only the elements of the structure to be actually shown in the AR-view. For example, one or more sewer-manholes can be used as anchors for e.g. showing an underground gas-pipe, when georeferenced 3D data of both is available—although the sewer system is not shown in the AR-view at all, or only the anchor elements of the sewer system are shown.

A two dimensional, in particular virtual, projection of the three dimensional information of the subsurface infrastructure to the image sensor of the camera is made in accordance with the present camera position and orientation information and with internal parameters of the camera, e.g. characterizing the cameras optical center, focal length, image distortions, etc. If the existing camera position and orientation information is not accurate, then an anchor element in the two dimensional projection of the subsurface infrastructure on the image sensor has a position and/or orientation that differs from the position and/or orientation of the anchor element in the image taken by the camera.

Misalignment of an augmented view with the image and the overlaid subsurface infrastructure is prevented according to the invention by comparing the projection position of the two dimensional projection of at least one anchor element of the subsurface infrastructure being visible on the at least one image of the real world scenery with the image position of the same anchor element on the at least one image. The difference between the image position and the projection position of the same anchor element is compensated for matching and overlaying the two dimensional projection derived from the three dimensional information of the subsurface infrastructure with the at least one image and thereby providing an improved augmented view. The augmented view is thereby configured to provide the one or more anchor element(s)—and consequently of all of the augmented subsurface infrastructure in the mixed reality view—with a spatially correctly matched alignment of the image and the projection. Preferably, such is done substantially in real time when providing the augmented view so that the matching is kept stable, also when the AR-viewing device is moved and/or when the position and/or orientation sensors of the device are drifting.

The inventive solution allows improving augmented view without time consuming placing of markers at selected positions in the real world scenery.

In a preferred embodiment, the at least one anchor element of the subsurface infrastructure being visible on the at least one image of the real world scenery is assigned to one of several predefined anchor element categories with corresponding position and shape characteristics in such a way that the anchor element can be assigned to an anchor element category independently of its construction state. The predefined anchor element categories allow a recognition procedure for finding anchor elements in the image and/or in the two dimensional projection of the subsurface infrastructure, no matter which construction progress or development state is actually present. In other words, an anchor object can be robustly or reliably recognized or detected as a specific anchor object type be it in an early increment (e.g. just a socket of an installation) or in its final, finished state (installation completed) or somewhere in between. The recognizing and finding is established automatically by an identifier and/or classifier in an artificial intelligence system, e.g. comprising a machine learned neural network. A starting point for the finding and/or for the categories can therein be derived from the three dimensional information of a subsurface infrastructure, respectively of its two dimensional projection in vicinity. In an embodiment, the anchor elements position, category and/or shape can be directly derived from the three dimensional information of a subsurface infrastructure in the projecting process, but in another embodiment, a (preferably substantially the same) routine for recognizing and/or finding of the anchor element can be applied to both, the image and the two dimensional projection. The size and the form of an anchor element on the image or on the two dimensional projection depends on the position of the camera. Recognizing an anchor element and assigning the anchor element to one of the predefined anchor element categories can be improved with shape characteristics including shape information in different scales and/or in different projections.

The position and shape characteristics of at least one of the predefined anchor element categories can include a central position and a shape information, wherein the shape information can e.g. comprise at least one point located at a circumference line of the anchor element. The shape information can also comprise a section of a circumference line or a closed circumference line. Position and shape characteristics of the predefined anchor element category corresponding to an anchor element found in the image and/or in the two dimensional projection of the subsurface infrastructure can be adjusted to the size and preferably to the perspective distortion of the found anchor element such that the position of the found anchor element can be deduced for the image and the two dimensional projection.

In a preferred embodiment, the position and shape characteristics of at least one of the predefined anchor element categories comprise at least information in respect of an axis passing through the central position and indicating a maximum extension of the predefined anchor element. This information about the direction of a maximum extension allows determining an orientation of a corresponding anchor element on the image and/or on the projection of the subsurface infrastructure.

Preferred embodiments use the position and shape characteristics assigned to the at least one anchor element to determine a projection position and/or a projection orientation and an image position and/or an image orientation of the at least one anchor element on the two dimensional projection of the image sensor and on the at least one image, respectively. If the difference between the image position and the projection position and/or the difference between the image orientation and the projection orientation is below a predefined maximum difference, then the difference between the image position and the projection position and/or the difference between the image orientation and the projection orientation is used for providing a matched two dimensional projection. Applying matching only for differences below a predefined maximum difference prevents matching with different anchor elements—which could result in wrong matchings.

In a simple embodiment, matching and overlaying the two dimensional projection derived from the three dimensional information of the subsurface infrastructure with the at least one image and thereby providing an improved augmented view comprises translating and/or rotating, optionally also scaling, the two dimensional projection derived from the three dimensional information of the subsurface infrastructure by the deduced differences of position and/or orientation.

In a further embodiment, matching and overlaying the two dimensional projection derived from the three dimensional information of the subsurface infrastructure with the at least one image and thereby providing an improved augmented view comprises improving image reference information of the at least one image by adjusting the camera position and/or the camera orientation in the image reference information of the real world scenery based on the difference between the image position and/or orientation and the projection position and/or orientation of the same anchor element, and deriving, in particular calculating or rendering, from the three dimensional information of the subsurface infrastructure a two dimensional projection from a point of view equal to the image sensor of the camera and preferably with a same field of view and imaging characteristic. Therein the two dimensional projection is made by using the improved reference information of the at least one image or by using the improved position and/or orientation of the camera, respectively—as derived by the difference.

A mobile augmented reality viewing device and a computer program product with program code being stored on a machine readable medium or embodied as an electromagnetic wave can be configured to execute the described embodiments of the method according to the invention.

In the providing of image reference information, e.g. localizing a displayed real world scenery can comprise deriving spatial reference information for the field of view of the image, in particular deriving six degree of freedom spatial reference information of the image or camera, respectively. The spatial reference information can comprise data from an inertial measurement unit (IMU), from a navigation system like a local and/or global navigation satellite system (GPS), a base station navigation and/or a Simultaneous Localization and Mapping (SLAM) unit.

If no navigation system is available, then the spatial reference information will preferably be derived by a Visual SLAM method. Visual SLAM allows constructing or updating a map of an unknown environment while simultaneously keeping track of the camera unit's location and orientation within it. The spatial reference information allows deriving location information for the field of view of the camera image. Visual SLAM (VSLAM) is evaluating the images from the camera.

The viewing device can also comprise a depth camera, like a time of flight camera, a stereo camera, a range image camera, a laser scanning unit, a structured light 3D scanner, etc. There can also be additional auxiliary cameras besides a main view camera mentioned above, which are pointing out from the viewing device to cover a maximum area around the operator, like at a Head Mounted Display (HMD). The deriving of the location information can in particular comprise sensor fusion of multiple of such sensors which can be configured to derive positional or navigation information, e.g. also to overcome instances when one or more of the multiple sensors is blocked or has insufficient data. The deriving of the spatial reference, image processing and/or IMU-evaluation can for example be provided by computational frameworks of augmented reality toolboxes.

In the providing of three dimensional information, e.g. geospatial information of the subsurface infrastructure can be derived from a storage, for example from a subsurface infrastructure-, BIM- or geospatial-database, e.g. via Open Geospatial Consortium (OGC), Web Map Service (WMS), Web Feature Service (WFS), Web Coverage Service (WGS) or others, preferably on-line by a wireless networking interface or from a local storage unit. The method according to the invention is then calculating a projection of the subsurface infrastructure with a same virtual field of view and perspective as the field of view of the image from the camera.

The augmented view combining the image from the camera and the projection of the subsurface infrastructure can be displayed by a two or three dimensional or stereo vision unit.

Some aspects of the present invention are preferably configured to provide an auto-adaptive AR-view that is rendered live or in real time in the field, based on a present real world image of video stream. Therein, a camera loopback is provided—in which a video feedback from the real world camera images is used.

Visual effects can be applied to the projection of the subsurface infrastructure to improve the recognition of the augmented reality view. For example, the subsurface structure can be displayed like looking on it as under a glass-like cover, in such a way that the subsurface structure is visible for a user—but at the same time the user sees the surface covering the subsurface structure. In other words, the surface covering the subsurface structures is turned into a virtual glass or frosted glass cover. For example, the projection of the subsurface structure can be overlaid to at least portions of the image from the camera in a faded and/or color filtered, semi-transparent form.

A frame-by-frame processing in real time can provide a realistic provision of the augmented view. The sun or light conditions might change quickly, wherefore the system needs to adapt substantially in real-time to maintain a realistic effect, for example when clouds move in front of the sun, when leaves of a tree provide a sophisticated and ever-moving shadow pattern on the ground, etc.

The features of the subsurface infrastructure that are visible in the image can be automatically detected, identified and matched with an according feature from the information of subsurface infrastructure by a computational unit.

The embodiments of the present invention are configured to spatially align anchor elements of the subsurface infrastructure to the corresponding anchor elements on images. For example, such image processing can also comprise specific object detection algorithms configured for detecting instances of semantic objects of a subsurface utility class, like an algorithm that uses machine learning trained on real world and/or simulated image data, such as Semantic Soft Segmentation, etc.

For example, features or portions of subsurface infrastructure which are at or in front of the surface, such as a drain cover, fireplug, lamppost, terminal box, duct cover, etc. can be detected and identified in the real world image and dimensionally surveyed in their location in the real world image.

The reference information indicating the position (X, Y, Z) and orientation (roll, pitch, yaw) can be determined by a sensor fusion of e.g. GNSS, inertial measurement unit, magnetometer, etc. Since these sensors might suffer from systematic errors, e.g. GNSS multipath, distortions of the magnetic field caused by large construction machines, etc., the resulting reference information might not be accurate enough for an accurate projection of the subsurface infrastructure.

In order to improve the accuracy of the reference information the at least one detected anchor element can be introduced as ground control point as known from photogrammetry into the optimization process that results in a more accurate position and orientation of the device. In other words, the reference information, i.e. the coordinates X, Y, Z and orientation angles roll, pitch, yaw, is fused with the image coordinates xA, yA and the corresponding world coordinates XA, YA, ZA of the at least one anchor element to compute more accurate values for X, Y, Z, roll, pitch, and yaw. Applying these values in the projection of the subsurface infrastructure leads to smaller deviations with respect to the real objects in the augmented view.

In the fusion of the reference information with and the measurements related to the anchor elements a weighting based on the accuracy of the corresponding measurements can be applied.

DESCRIPTION OF THE DRAWINGS

Methods, devices, and computer programs according to the invention are described or explained in more detail below, purely by way of example, with reference to working examples shown schematically in the drawing. Specifically, shown is in FIG. 1 a schematic side view of a person with an augmented reality helmet standing on a street with a manhole;

FIG. 6 examples for object representations and segmentations;

FIG. 7 examples for anchor element matching;

DETAILED DESCRIPTION

The diagrams of the figures should not be considered as being drawn to scale. Where appropriate, the same reference signs are used for the same features or for features with similar functionalities. Different indices to reference signs are used to differentiate between different embodiments of a feature which are exemplary shown.

Figure 1:
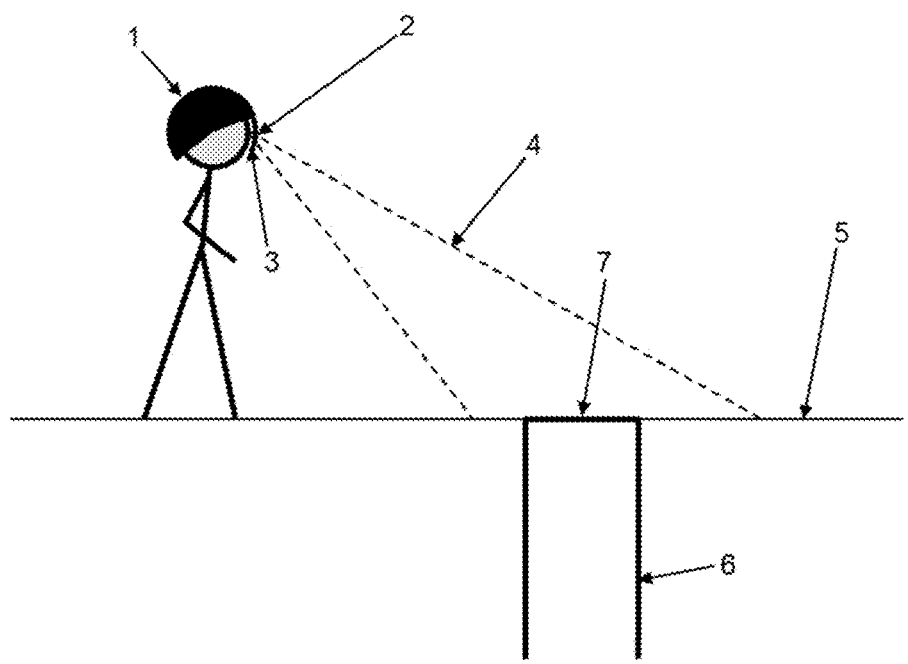

FIG. 1 shows a person with an augmented reality helmet 1 or AR-helmet 1, respectively. The AR-helmet 1 is comprising a camera 2, a display 3 and a control unit preferably at the camera. The control unit provides information in respect of camera position and orientation in the real world scenery. This information is derived from one or more motion tracking technologies, like a global navigation satellite systems (GNSS) e.g. GPS and/or a base station navigation and/or an accelerometer and/or a gyroscope and/or an inertial measurement unit (IMU) and/or a solid state compass and/or a structure-from-motion unit and/or a bundle adjustment unit and/or a Simultaneous Localization and Mapping (SLAM) unit.

The control unit is providing image reference information to the current image of the camera. The image reference information is comprising a camera position and a camera orientation in the real world scenery at the time of taking the image and internal parameters of the camera, e.g. characterizing the optical center, the focal length, and or other imaging relevant parameters of the camera setup.

The camera 2 has a field of view 4. In the shown situation the field of view 4 is directed to a street 5 with a manhole being the visual part of a subsurface infrastructure 6. The manhole is used as anchor element 7 of the subsurface infrastructure 6.

Figure 2:
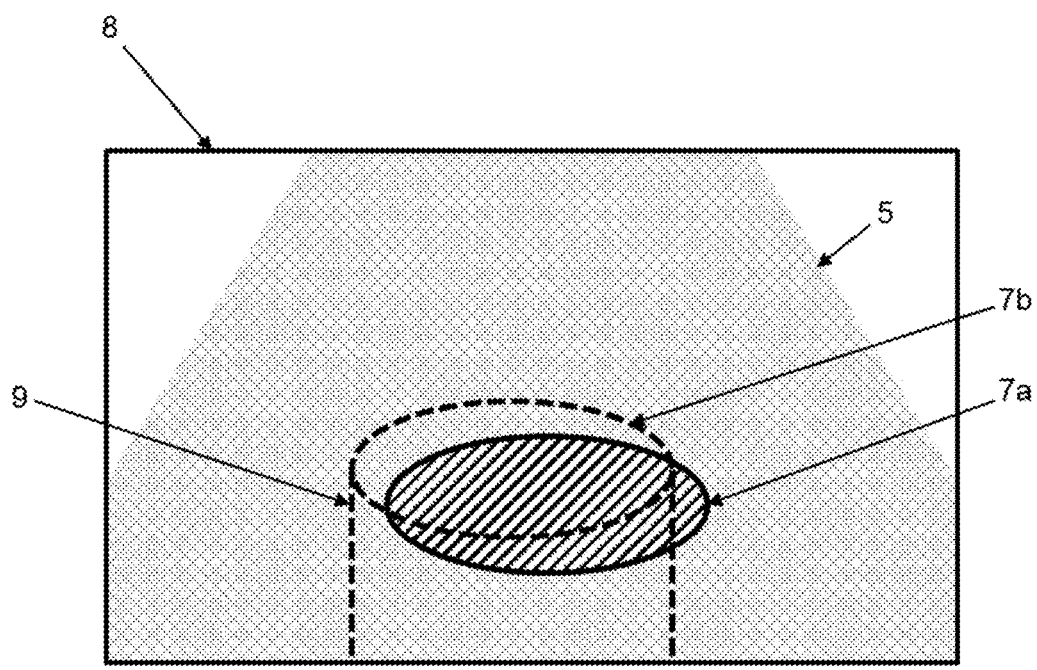
FIG. 2 an image taken by the camera of the augmented reality helmet, wherein the two dimensional projection of a subsurface infrastructure is added to the image.

FIG. 2 shows the image 8 taken by the camera 2 showing the street 5 and the anchor element image 7a. A three dimensional information 9 of a subsurface infrastructure 6 is provided, e.g. from an offline or online storage media, from a GIS- or BIM database or the like, for example in form of CAD-data. Of the provided three dimensional information 9 of the subsurface infrastructure 6 a two dimensional projection to the image sensor is added or combined to the image 8. This projection of the subsurface infrastructure 6 includes an anchor element projection 7b. Overlaying the image 8 and the projection of the subsurface infrastructure 6 will therein likely show a mismatch of the anchor element image 7a and the anchor element projection 7b.

Figure 3:
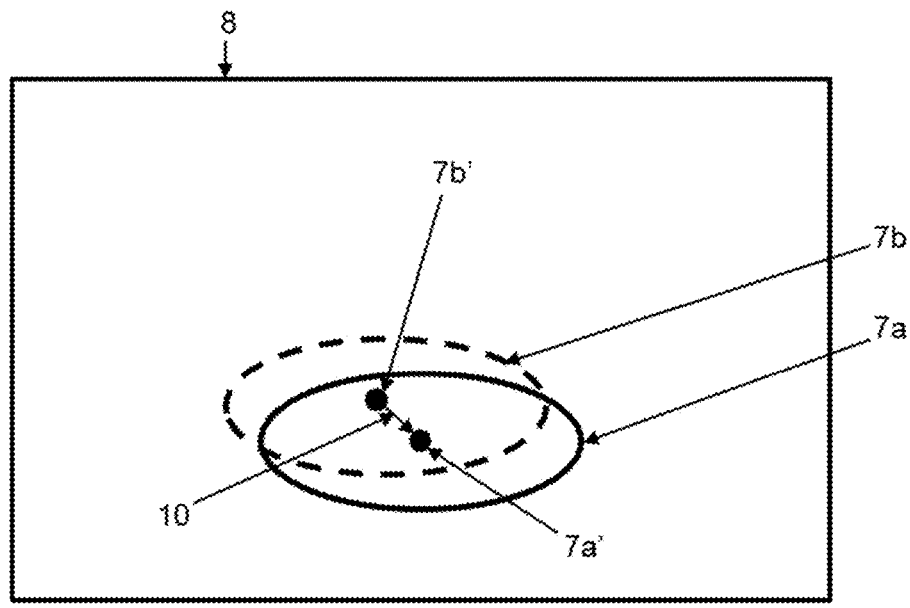
FIG. 3 an extract of FIG. 2.

FIG. 3 shows the anchor element image 7a and the anchor element projection 7b of FIG. 2. The center of the anchor element projection 7b is a projection position 7b' of the anchor element 7. The center of the anchor element image 7a is an image position 7a' of the anchor element 7. The position difference 10 between the image position 7a' and the projection position 7b' of the same anchor element 7 is compensated for matching and overlaying the two dimensional projection derived from the three dimensional information 9 of the subsurface infrastructure 6 with the image 8. Such can comprise an adaption or correction of the image reference information used in the projecting to compensate a difference between the image position and the projection position of the same anchor element—resulting in shift, rotation and/or scaling of the projection in such a way that there is a visual match of the anchor element(s) in both.

Figure 4:
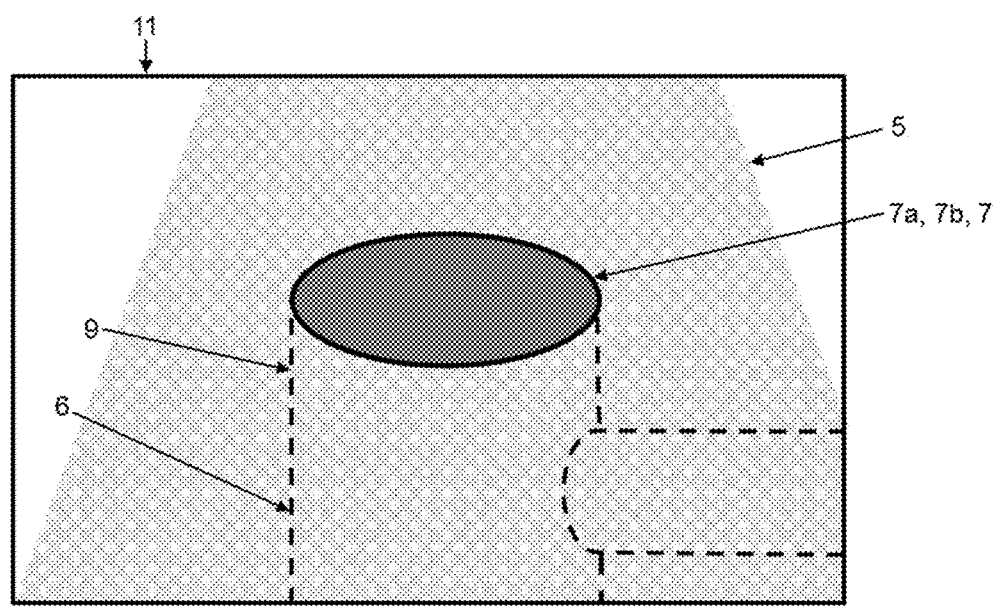
FIG. 4 an improved augmented view.

FIG. 4 shows an improved augmented view 11 of the image 6 and the matched two dimensional projection of the subsurface infrastructure 6. This improved view 11 is provided at the display 3 of the augmented reality helmet 1. On the improved augmented view 11 the anchor element image 7a and the anchor element projection 7b are fitting perfectly and therefore showing the anchor element 7. The shown two dimensional projection of the three dimensional information 9 of the subsurface infrastructure 6 is visualizing the subsurface infrastructure 6 in the real world scenery.

Figure 5A:
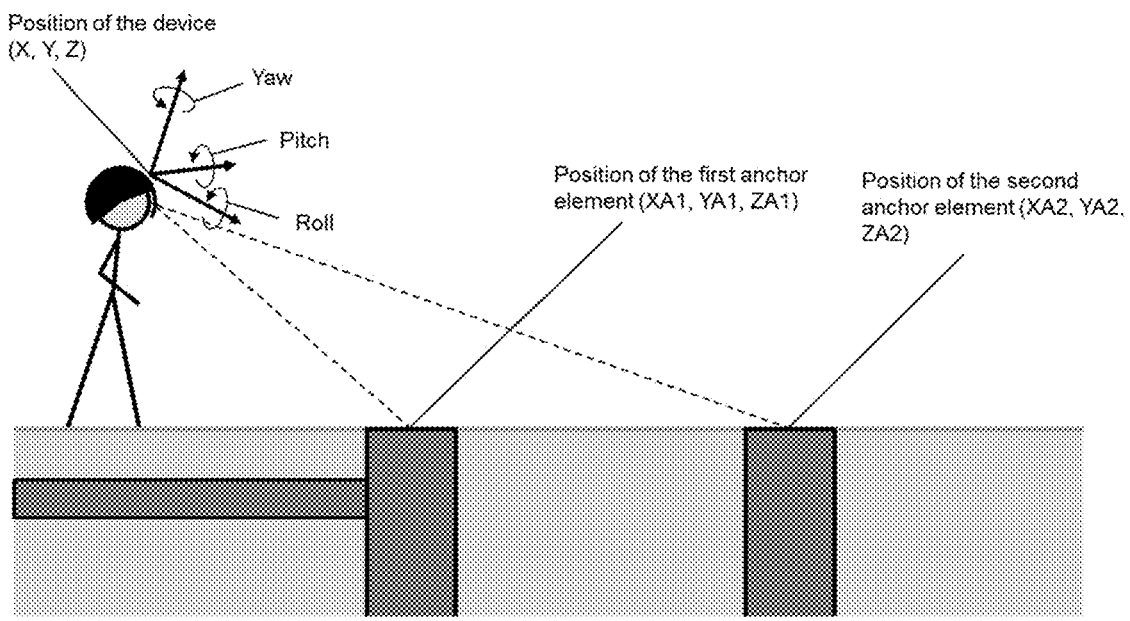
FIG. 5a,b examples for positions of an AR device and anchor elements.
Figure 5B:
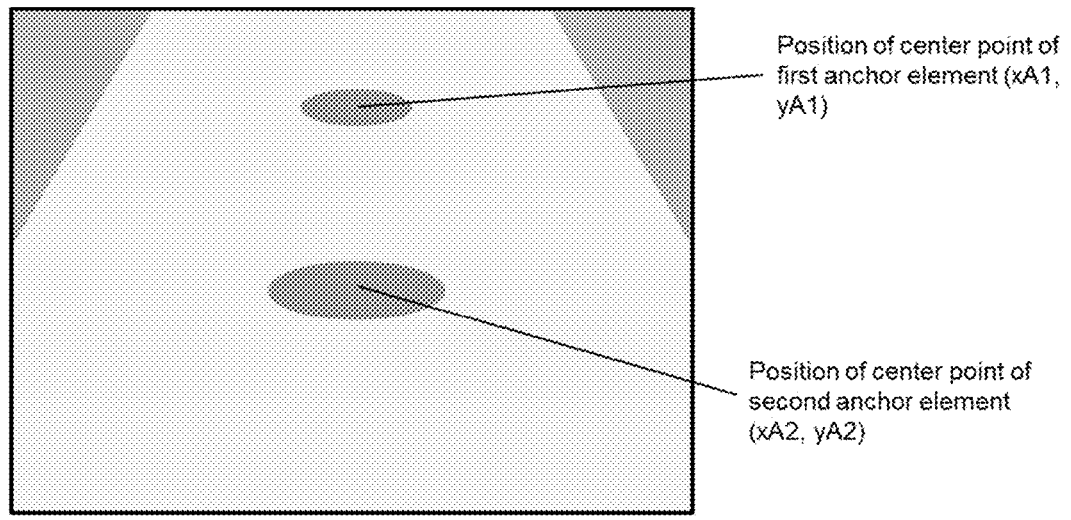

In FIG. 5a, the position and orientation of the AR device (X, Y, Z, yaw, pitch, roll) and the position (XA1, YA1, ZA1) of a first anchor element (near the user of the AR device) and the position (XA2, YA2, ZA2) of a second anchor element (farther away from the user) are shown, both anchor elements embodied in the example as man hole covers. In FIG. 5b the corresponding image view with position (xA1, yA1) of a center point of the first anchor element and position (xA2, yA2) of a center point of the second anchor element is shown. Alternatively to adjusting all the six degrees-of-freedom, i.e. X, Y, Z, roll, pitch, and yaw, the accuracy of only a subset of this parameters can be improved. For instance, the projection of the anchor elements can be vertically and horizontally shifted to their positions as detected in the image. Basically, this would correspond to adjust the pitch (vertical rotation) and yaw (horizontal rotation) of the AR device.

In FIG. 6, several representations of a light switch/power socket combination depending on the construction progress are shown in the upper part i.e. different visual appearances of a light switch/power socket combination depending on the construction progress, and corresponding object segmentations in the lower part of FIG. 6. The detection model can be trained on all of these variations in order to robustly detect the anchor element independently from the construction state. Furthermore, the detection model can be combined with an object segmentation model determining the accurate shape of the anchor element.

The shape of the anchor element can then be matched with the two dimensional anchor element projection of the same element as shown in FIG. 7, illustrating in the upper part (from left to right) the steps of 7A: detection of the object, 7B: segmentation of the object (optional), and 7C: determination of offset using a projection of an object shape from a model (7D) and 7E: compensation of the offset (lower left part of FIG. 7). Alternatively as shown in the lower right part (7B1), the projection can be directly matched with the bounding box resulting from the object detection without the segmentation step. In both cases, the matching can be based on minimizing the deviations between the contours resulting from the detected object and the projection.

Figure 8:
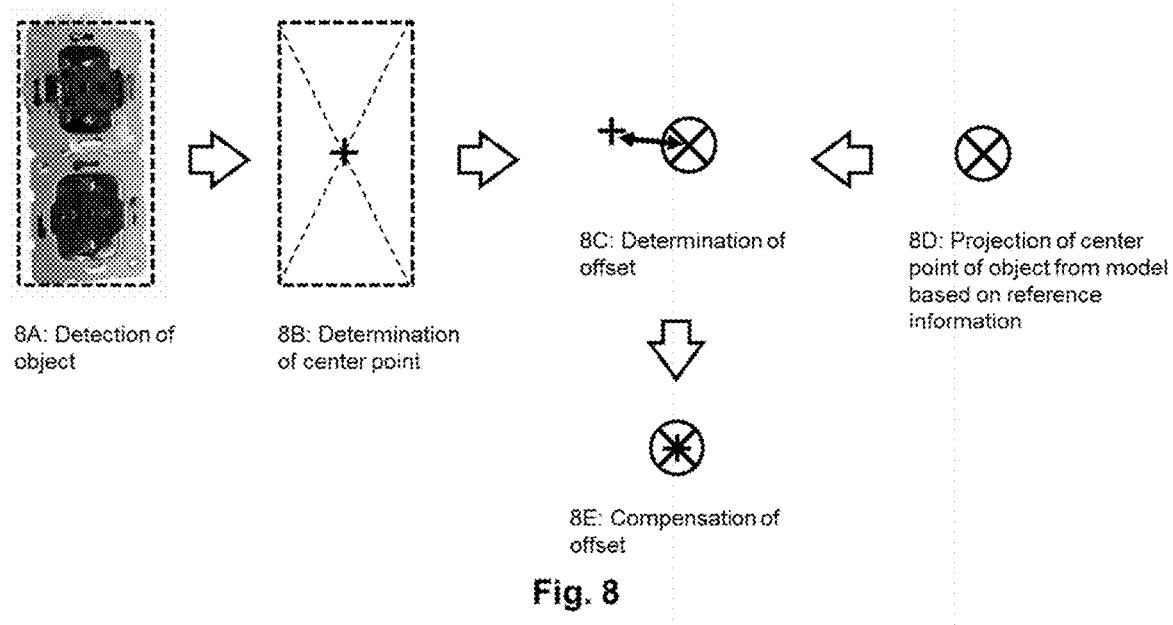
FIG. 8 an example of object segmentation.

Alternatively, from the bounding box or the shape resulting from the object segmentation a center point can be derived as shown in FIG. 8, illustrating in the upper part (from left to right) the steps of 8A: detection of an object, 8B: determination of a center point and 8C: determination of an offset using a projection of center point of the object from a model based on reference information (8D). Thus, this center point is matched with the two dimensional anchor element projection representing the object center of the three dimensional information and used for compensation (8E) of the offset as indicated in the lower part of FIG. 8.

Figure 9:
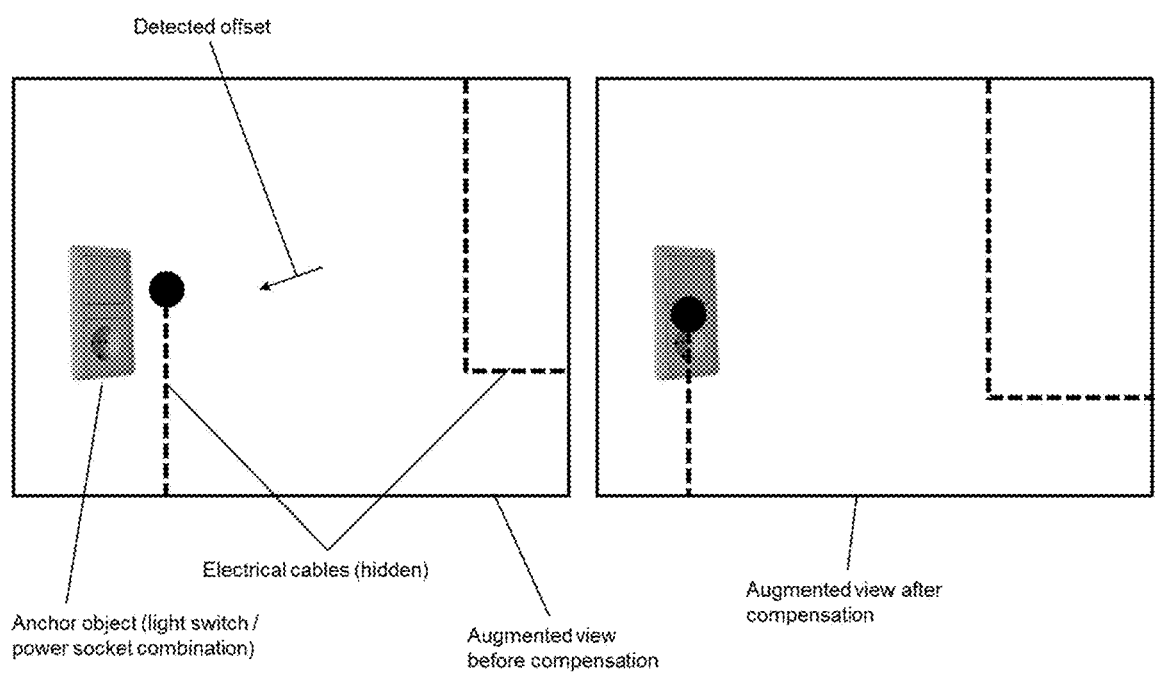
FIG. 9 an example of a compensation of the offset is shown.

In FIG. 9, an example of a compensation of the offset is shown. In the left image, showing an augmented view before compensation, a deviation of the anchor object, i.g. a light switch/power socket combination and the reprojection of the corresponding element from the subsurface information is observable (detected offset arrow). Moreover, the hidden electrical cables are visualized (dashed lines). Based on the matching of the detected light switch/power socket combination in the image and the corresponding two dimensional anchor element projection an offset is detected, which is then compensated. In the right image, the augmented view after compensation of the offset is shown: the view of the light switch/power socket combination is matched to the center point (black dot) of the model.

What is claimed is:

1. A method for providing an augmented view of a real world scenery and of an occluded subsurface infrastructure, the method comprising:
   taking at least one image of the real world scenery by a camera with an image sensor;
   providing image reference information to the at least one image, wherein the image reference information is comprising a camera position and a camera orientation in the real world scenery at the time of taking the at least one image;
   providing three dimensional information of a subsurface infrastructure; and
   deriving from the three dimensional information of the subsurface infrastructure a two dimensional projection on the image sensor, wherein the two dimensional projection is made by using the reference information of the at least one image,
   wherein a projection position of a two dimensional anchor element projection of at least one anchor element of the subsurface infrastructure being visible on the at least one image of the real world scenery is compared with an image position of the anchor element image of the anchor element on the at least one image, and
   wherein a difference between the image position and the projection position of the same anchor element is compensated for matching and overlaying the two dimensional projection derived from the three dimensional information of the subsurface infrastructure with the at least one image and thereby providing an improved augmented view,
   wherein the at least one anchor element of the subsurface infrastructure, being visible on the at least one image of the real world scenery and/or in the two dimensional projection at the image sensor, is assigned to one of several predefined anchor element categories based on a machine learned identifier and/or classifier unit, preferably comprising a deep learning e.g. with convolutional neural networks, in such a way that the anchor element can be assigned to an anchor element category independently of its construction state.

2. The method according to claim 1, further comprising matching and overlaying the two dimensional projection derived from the three dimensional information of the subsurface infrastructure with the at least one image and thereby providing an improved augmented view comprises translating or rotating the two dimensional projection derived from the three dimensional information of the subsurface infrastructure.

3. The method according to claim 1, wherein the matching and overlaying the two dimensional projection derived from the three dimensional information of the subsurface infrastructure with the at least one image and thereby providing an improved augmented view comprises:
   improving image reference information to the at least one image by adjusting the camera position or the camera orientation in the image reference information of the real world scenery based on the difference between the image position and the projection position of the same anchor element, and
   deriving from the three dimensional information of the subsurface infrastructure a two dimensional projection at the image sensor, wherein the two dimensional projection is made by using the improved reference information of the at least one image.

4. The method according to claim 3, wherein improving image reference information to the at least one image by adjusting the camera position or the camera orientation in the real world scenery comprises:
- deriving the position of the anchor element from the three dimensional information of the subsurface infrastructure, and
- using the position of the anchor element as reference position for improving the camera position or the camera orientation in the real world scenery.

5. The method according to claim 1, wherein the camera position and/or the camera orientation in the real world scenery is deduced from data of a navigation system like a navigation satellite system (GPS), a base station navigation, an accelerometer, a gyroscope, an inertial measurement unit (IMU), a solid state compass, a structure-from-motion unit, a bundle adjustment unit, a Simultaneous Localization and Mapping (SLAM) unit, or of a spatial reference recognition unit.

6. A mobile augmented reality viewing device configured to execute a method according to claim 1.

7. A computer program product with program code being stored on a non-transitory machine readable medium, the program code being configured for the execution of at least one of the methods according to claim 1.

8. A method for providing an augmented view of a real world scenery and of an occluded subsurface infrastructure, the method comprising:
- taking at least one image of the real world scenery by a camera with an image sensor;
- providing image reference information to the at least one image, wherein the image reference information is comprising a camera position and a camera orientation in the real world scenery at the time of taking the at least one image;
- providing three dimensional information of a subsurface infrastructure; and
- deriving from the three dimensional information of the subsurface infrastructure a two dimensional projection on the image sensor, wherein the two dimensional projection is made by using the reference information of the at least one image,
- wherein a projection position of a two dimensional anchor element projection of at least one anchor element of the subsurface infrastructure being visible on the at least one image of the real world scenery is compared with an image position of the anchor element image of the anchor element on the at least one image, and
- wherein a difference between the image position and the projection position of the same anchor element is compensated for matching and overlaying the two dimensional projection derived from the three dimensional information of the subsurface infrastructure with the at least one image and thereby providing an improved augmented view, and
- wherein the at least one anchor element of the subsurface infrastructure is visible on the at least one image of the real world scenery is assigned to one of several predefined anchor element categories with corresponding position and shape characteristics.

9. The method according to claim 8, wherein the shape characteristics include shape information in different scales and/or in different projections.

10. The method according to claim 8, wherein the position and shape characteristics of the predefined anchor element categories comprise a central position and a shape information, wherein the shape information is comprising at least one point located at a circumference line of the anchor element.

11. The method according to claim 8, wherein:
- the position and shape characteristics of at least one anchor element of the subsurface infrastructure are used to determine a projection position and an image position of the at least one anchor element on the two dimensional projection of the image sensor and on the at least one image, respectively,
- the difference between the image position and the projection position is used for providing a matched two dimensional projection, only if the difference between the image position and the projection position is below a predefined maximum difference.

12. The method according to claim 8, wherein:
- the position and shape characteristics of at least one anchor element of the subsurface infrastructure are used to determine a projection orientation and an image orientation of the at least one anchor element on the two dimensional projection of the image sensor and on the at least one image with corresponding position and shape characteristics,
- the difference between the image orientation and the projection orientation is used for providing a matched two dimensional projection, only if the difference between the image orientation and the projection orientation is below a predefined maximum difference.

13. The method according to claim 11, wherein determining the projection position of the anchor element, the projection orientation, the image position, or image orientation comprises edge extraction and fitting of the extracted edge information to shape characteristics of one of the predefined anchor element categories.

14. The method according to claim 11, wherein determining the projection position of the anchor element, the projection orientation, the image position, or image orientation comprises least-squares template matching.

* * * * *